June 23, 1959 H. J. FRALISH 2,891,505

SOLDER SPRAYING DEVICE

Filed July 19, 1957

INVENTOR
H. J. FRALISH
BY C. R. Hamilton
ATTORNEY

United States Patent Office 2,891,505 Patented June 23, 1959

2,891,505

SOLDER SPRAYING DEVICE

Howard J. Fralish, Indianapolis, Ind., assignor to Western Electric Company, Incorporated, New York, N.Y., a corporation of New York Application July 19, 1957, Serial No. 673,084

7 Claims. (Cl. 118—323)

This invention relates to solder spraying devices and more particularly to devices for spraying zonal bands of solder onto capacitors to serve as terminals.

A previously used practice of spraying solder terminals on capacitors has been to mask portions of the capacitor and then to use a conventional solder spraying device for coating the unmasked area of the capacitor. Obviously, the masking of the capacitor takes time and is a fairly tedious operation.

With this problem in mind, one of the objects of this invention is to provide a device for spraying a precisely defined strip or band of solder onto a capacitor to serve as a terminal.

Another object of this invention is to provide a solder spraying device having a rotating disc which picks up solder from a supply and applies it to a capacitor to form a strip.

A further object of this invention is to provide a solder spraying device having a rapidly rotating knurled member mounted at one end of a channel containing molten solder for spraying a precisely defined strip or band of solder onto a capacitor.

With these and other objects in mind, the present invention contemplates a rockably mounted container of molten solder having a channel member extending therefrom for directing the solder to a knurled disc mounted at the end of the channel. The knurled disc is rotated at a high speed to pick up solder from the channel and throw it onto an article in a precisely defined band.

Figure 1:
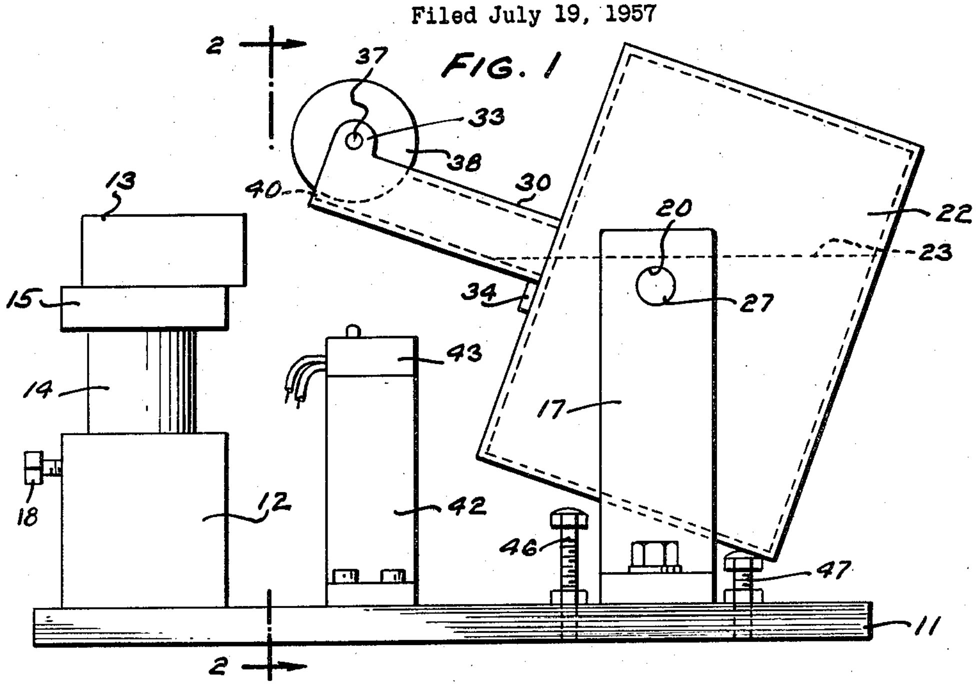
Figure 2:
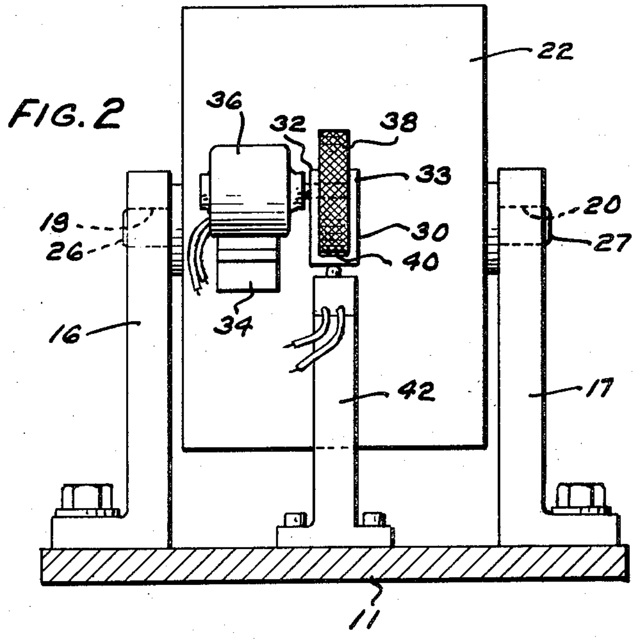
Figure 3:
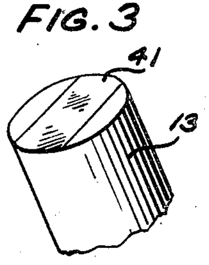

Other objects and advantages of the invention will become apparent by reference to the following detailed description and the accompanying drawing illustrating a preferred embodiment of the invention, in which Fig. 1 is a front view of a device embodying the principles of the present invention;

Fig. 2 is an end view of the device showing the manner in which a knurled disc is mounted in a channel member; and Fig. 3 is a fragmentary perspective view of the capacitor showing a zonal band of solder which has been sprayed onto the capacitor.

Referring now in detail to the drawing, a base 11 is shown supporting a tubular member 12 which receives a shaft portion 14 of a member 15. A wound capacitor 13 to which a band of solder is to be applied rests upon the member 15. The position of the member 15 may be varied in a vertical direction by moving the shaft portion 14 in the tubular member 12. A set screw 18 threaded through the tubular member 12 is provided for holding the member 15 in adjusted position.

The base 11 also supports a pair of L-shaped brackets 16 and 17 having at their upper ends apertures 19 and 20, respectively. A container 22 for holding molten solder 23 has secured thereto a pair of pins 26 and 27 which are positioned in the apertures 19 and 20 in the brackets 16 and 17 for rockably supporting the container 22.

A rectangular hollow channel member 30 secured to the container 22 and having its central opening interconnected with the container 22 projects toward the capacitor 13 in cantilever fashion. The free end of the channel member 30 is open and is provided with a pair of upstanding, apertured lugs 32 and 33.

A bracket 34 rigidly secured to the container 22 supports an electrical motor 36 having a shaft 37 extending through the apertured lugs 32 and 33. A disc 38 having a knurled periphery is mounted on the shaft 37 in the open end of the channel 30. The diameter of the disc 38 is such that only a very small opening 40 is defined between the disc 38 and the bottom of the channel member 30.

A bracket 42 mounted on the base 11 supports a limit switch 43 which is engaged and closed by the channel member 30 for connecting a power supply (not shown) to the motor 36 when the container 22 is rocked counterclockwise on the pins 26 and 27 (Fig. 1). Adjusting screws 46 and 47 threaded into the base 11 are provided for limiting movement of the container 22.

In operation of the device, the container 22 is filled with molten solder to a level substantially as illustrated in Fig. 1 whereby solder flows from the container 22 into the channel member 30 when the container 22 is rocked counterclockwise. A capacitor 13 is positioned on the member 15 and the container 22 is manually or automatically pivoted counterclockwise (Fig. 1) until the channel member 30 is aligned with the capacitor 13, whereupon the channel member 30 closes the limit switch 43 to apply power to the motor 36. The motor 36 spins the knurled disc 38 at a high rate of speed to move molten solder through the opening 40 and throw it onto the capacitor 13 to form a strip or band 41 of solder.

When the band 41 of solder is of a desirable depth, the container 22 is pivoted into the position illustrated in Fig. 1, whereupon the switch 43 opens and the motor 36 is disconnected from its power supply. Another capacitor 13 or one of a group of capacitors in line is positioned on the member 15 and the above procedure is repeated. The member 15 may be moved upward or downward to adjust its position relative to the disc 38 to accommodate capacitors of various sizes.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A device for soldering articles, comprising a base, means on the base for holding an article to which solder is to be applied, a container pivotally mounted on the base for holding a supply of molten solder, a channel secured to the container and extending toward the article when the container is pivoted to one position a rotatable member mounted in the channel for imparting an impelling force to the molten solder in the channel to throw said solder onto the article, and means on the container responsive to movement of the container into said one position for rotating the member.

2. A device for spraying solder onto an article, comprising a base, means on the base for holding an article to be sprayed, a container rockably mounted on the base for holding a supply of molten solder, a channel member secured to the container and extending toward the article for receiving molten solder from the container when said container is rocked to one position, a disc rotatably mounted in the channel member and having a knurled periphery for imparting an impelling force to the solder to throw it onto the article, and means on the container responsive to movement of the container to said one position for rotating the disc.

3. A device for spraying solder onto an article, comprising a base, means on the base for holding an article to which solder is to be applied, a container movably mounted on the base for holding a supply of molten solder, a channel leading from the container toward the article for receiving solder from the container when said container is moved to one position, a rotatable member mounted in the channel for imparting an impelling force to the molten solder in the channel to throw said solder onto the article, said article holding means being adjustably mounted on the base for varying the position of the article relative to the channel and the rotating member, and means on the container responsive to movement of said container to said one position for rotating the member.

4. A device for applying a coating of solder to an article, comprising supporting means, means on the supporting means for holding an article, a container tiltably mounted on the supporting means, a channel member mounted on the container in alignment with the article and adapted to receive a supply of molten solder from the container when said container is tilted, and a rotating disc mounted in the channel for imparting an impelling force to the solder to throw said solder onto the article.

5. A device for spraying a band of solder onto an article, comprising supporting means for holding an article, a container tiltably mounted on the supporting means for holding molten solder, a channel member mounted on the container and adapted to receive molten solder when the container is tilted, said channel member having an open end positioned adjacent to the article, a disc rotatably mounted in the open end of the channel and having a roughened periphery, and means carried by the container and responsive to tilting of said container for rotating the disc to throw solder from the channel member onto the article.

6. A device for spraying a band of solder onto an article, comprising a base, means on the base for supporting an article, a container rockably supported on the base for holding a supply of molten solder, a channel member secured to the container for receiving solder when the container is rocked in one direction, said channel member being moved into alignment with the article when the container is rocked in said one direction, a disc rotatably mounted in the channel, and means on the container for rotating the disc to throw molten solder onto the article.

7. A device for spraying solder onto an article, comprising a base, means on the base for holding an article, a container rockably mounted on the base for holding molten solder, a channel member secured to the container for receiving molten solder from the container when said container is rocked in one direction, said channel member being moved into alignment with the article when the container is rocked in said one direction, a disc rotatably mounted on the channel member and having a knurled periphery for imparting an impelling force to the solder in the channel member to throw said solder onto the article, driving means on the container for rotating the disc, and means responsive to the position of the channel member for actuating the driving means.

References Cited in the file of this patent

UNITED STATES PATENTS

| | | |
|---|---|---|
| 2,188,721 | McWhorter et al. | Jan. 30, 1940 |
| 2,448,297 | Christensen | Aug. 31, 1948 |
| 2,783,086 | Brennan | Feb. 26, 1957 |

FOREIGN PATENTS

| | | |
|---|---|---|
| 263,443 | Germany | July 26, 1910 |
| 746,187 | Great Britain | Mar. 14, 1956 |